United States Patent Office 2,979,502
Patented Apr. 11, 1961

2,979,502
PHENTHIAZINE DERIVATIVES

Paul Gailliot, Paris, and Jean Baget, Ermont, France, assignors to Société des Usines Chimiques Rhone-Poulenc, Paris, France, a corporation of France No Drawing. Filed May 19, 1958, Ser. No. 735,944

Claims priority, application France May 31, 1957

4 Claims. (Cl. 260—243)

This invention relates to new derivatives of phenthiazine and to processes for their preparation.

It is well known that various N-substituted phenthiazine derivatives possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motionsickness. Nevertheless, of the very large number of possible N-substituted phenthiazine compounds that have heretofore been proposed or tested by various workers, only comparatively few types have been proved to have useful application in human or veterinary medicine. Both the nature and the degree of useful effect can radically alter even with apparently small changes in chemical structure.

It is an object of the present invention to provide new phenthiazine derivatives which possess unexpectedly useful pharmacological properties.

It is a further object of the invention to provide processes for the production of these new compounds.

The phenthiazine derivatives of the present invention are those which conform to the general formula:

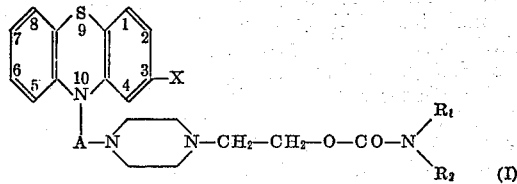

(I)

and their salts and quaternary ammonium derivatives, wherein A represents the grouping —$(CH_2)_3$— or the grouping

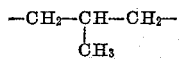

X represents a lower alkoxycarbonyl group or a cyano, methylthio, methanesulphonyl or dimethylsulphamoyl group, $R_1$ and $R_2$ are the same or different and either each represents a hydrogen atom or a lower alkyl group or, together with the nitrogen atom to which they are attached, they collectively represent a heterocyclic group such as pyrrolidino, piperidino, piperazino or morpholino, and the piperazine nucleus may be substituted by one or more lower alkyl groups.

The qualification "lower" as applied herein means that the group in question contains not more than four carbon atoms.

These new phenthiazine compounds may be prepared by the application of known methods for the conversion of phenthiazine and its C-substitution products into the corresponding 10 - aminoalkyl - phenthiazines. Specific procedures that can be employed are as follows:

(1) Interaction of a phenthiazine derivative of the general formula:

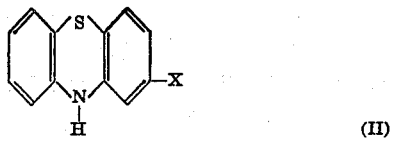

(II)

(wherein X is as hereinbefore defined) with a piperazine derivative of the general formula:

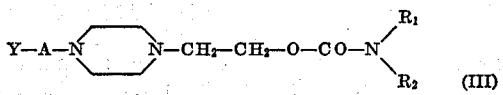

(III)

(wherein Y represents the acid residue of a reactive ester, such as a halogen atom or a sulphonic or sulphuric ester residue and the other symbols are as hereinbefore defined). Preferably the reaction is carried out in the presence of a condensing agent such as an alkali metal or a derivative thereof such as amide or hydride.

(2) Interaction of a phenthiazine derivative of the general formula:

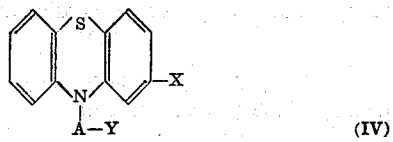

(IV)

with a piperazine derivative of the general formula:

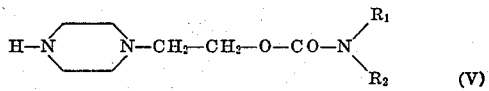

(V)

the various symbols being as hereinbefore defined.

(3) Interaction of a phenthiazine derivative of the general formula:

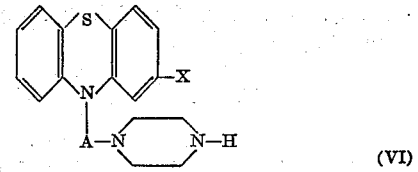

(VI)

with a reactive ester of the general formula:

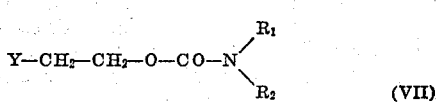

(VII)

the various symbols being as hereinbefore defined.

(4) Interaction of a phenthiazine derivative of the general formula:

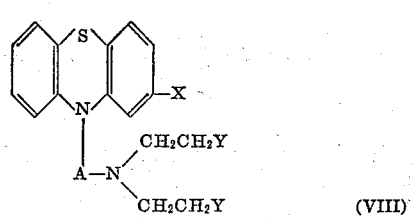

(VIII)

with an amine of the general formula:

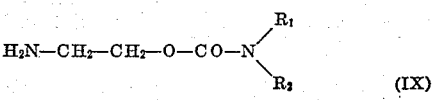

(IX)

the various symbols being as hereinbefore defined.

(5) Interaction of a phenthiazine derivative of the general formula:

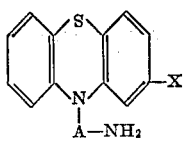
A—NH₂    (X)

with a reactive diester of the general formula:

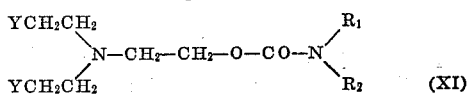    (XI)

the various symbols being as hereinbefore defined.

The foregoing methods may be carried out with or without a solvent in the presence or absence of a condensing agent. It is generally advantageous to operate in an inert organic solvent medium, such as an aromatic hydrocarbon (preferably benzene, toluene or xylene), an ether (for example, diethyl ether) or an amide (for example, dimethylformamide) usually in the presence of a condensing agent (preferably in the form of an alkali metal or a derivative thereof such as hydride, amide or carbonate).

The reactions are carried out at room temperature or at an elevated temperature according to the nature of the reactants and the presence or absence of solvent and condensing agent.

(6) Conversion of an alcohol (or corresponding alcoholate) of the general formula:

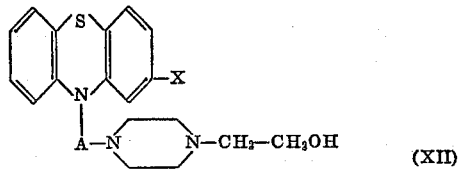    (XII)

(wherein A and X are as hereinbefore defined) by known methods for converting the hydroxy group into a urethane grouping. The conversion of the hydroxy group into the urethane grouping

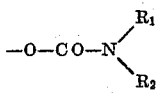

$R_1$ and $R_2$ being as hereinbefore defined, may be effected by the action of isocyanic acid or an alkyl isocyanate, the action of a carbamyl halide, the action of phosgene followed by ammonia or a primary or secondary amine, or the action of an N-bromoamide, $R_1CONHBr$.

(7) Decomposition of a phenthiazine-10-carboxylate of the general formula:

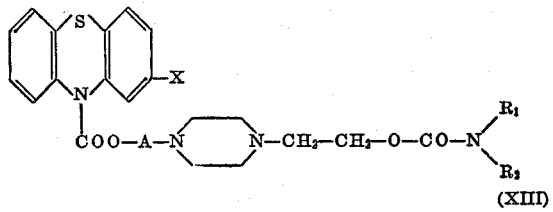    (XIII)

(wherein the various symbols are as hereinbefore defined) by heating the carboxylate, preferably to a temperature above 100° C., for example between 150 and 220° C., until evolution of carbon dioxide ceases.

The reaction can be effected with the phenthiazine-10-carboxylate alone, i.e. without a diluent, or in an inert organic solvent of high boiling point such as diphenyl or diphenyl oxide, o-dichlorobenzene, quinoline or weak bases.

(8) Cyclisation, preferably in a solvent in the form of a substituted amide of a lower aliphatic acid, in the presence of an alkaline condensing agent such as an alkali metal hydroxide or carbonate and optionally in the presence of a dehydrohalogenation catalyst such as copper powder, of a compound of the general formula:

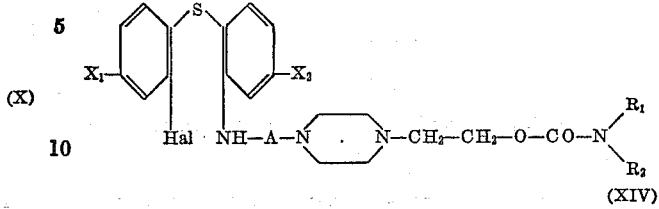    (XIV)

(wherein one of $X_1$ and $X_2$ represents a hydrogen atom and the other the group X, Hal represents a halogen atom, preferably chlorine or bromine, and the other symbols are as hereinbefore defined).

Of the foregoing methods, Nos. 3 and 7 are illustrated in the examples which follow.

The phenthiazine derivatives of the present invention possess interesting pharmacodynamic properties; in particular they are outstandingly active as sedatives, analgesics, antiemetics and antihistaminics.

For therapeutic purposes, the bases of general Formula I are preferably employed as such or in the form of acid addition salts containing anions which are relatively innocuous to the animal organisms in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. Similarly, they may also be employed in the form of quaternary ammonium salts obtained by reaction with organic halides (e.g. methyl or ethyl iodide, chloride or bromide or allyl or benzyl chloride or bromide) or other reactive esters, e.g. toluene-p-sulphonates.

The following examples, in which the melting points indicated were determined on the Kofler bench, illustrate the invention.

*Example I*

A mixture of 3-cyano-10-(3-1'-piperazinylpropyl)-phenthiazine (14.3 g.), 2-chloroethyl 4-methylpiperazinylcarboxylate (9.4 g.), anhydrous potassium carbonate (6.22 g.) and anhydrous toluene (20 cc.) is heated under reflux for 8 hours with agitation. After cooling, the mixture is poured into water (75 cc.), the product formed is extracted with benzene, the benzene solution is extracted with N hydrochloric acid (150 cc.) and the base is liberated with alkali and extracted with ether. The hydrochloride obtained by the addition of anhydrous hydrogen chloride to the ethereal solution is purified by crystallisation from alcohol. There is obtained 3 - cyano-10 - [3 - (4 - 4' - methyl - 1' - piperazinylcarbonyloxyethyl - 1 - piperazinyl)propyl]phenthiazine trihydrochloride (11.5 g.), M.P. 200–205° C. (decomp.).

*Example II*

Proceeding as in Example I but commencing with 3-cyano-10-(3-1'-piperazinylpropyl)phenthiazine (14.3 g.), 2-chloroethyl morpholinocarboxylate (8.78 g.), anhydrous potassium carbonate (6.22 g.) and anhydrous toluene (20 cc.), there is obtained 3 - cyano - 10 - [ - 3- (4 - morpholinocarbonyloxyethyl - 1 - piperazinyl)propyl]phenthiazine dihydrochloride (7.4 g.), M.P. about 200–205° C.

*Example III*

Proceeding as in Example I but commencing with 3-cyano-10-(3-1'-piperazinylpropyl)phenthiazine (10.8 g.), 2-chloroethyl dimethylcarbamate (5.18 g.), anhydrous potassium carbonate (4.68 g.) and anhydrous toluene (25 cc.), there is obtained 3 - cyano - 10 - [3 - (4 - dimethylcarbamoyloxyethyl - 1 - piperazinyl)propyl] phenthiazine acid dimaleate (10 g.), M.P. 176–178° C.

Example IV

3 - dimethylsulphamoyl - 10 - (3 - 1' - piperazinyl-2-methylpropyl)phenthiazine (M.P. 149° C.) (6 g.) is heated for 7 hours under reflux at 115–120° C. with 2-chloroethyl dimethylcarbamate (2.26 g.), anhydrous potassium carbonate (2.04 g.) and toluene (6 cc.). When the reaction is complete the thick paste obtained is cooled and then diluted with water (25 cc.). The suspension obtained is then extracted several times with chloroform. The chloroformic liquors are then extracted with dilute sulphuric acid. After the combined acid solutions have been made alkaline with a 10% solution of sodium carbonate the basic products are extracted several times with chloroform and the combined chloroformic solutions dried over anhydrous potassium carbonate. The solvent is distilled in vacuo and a resinous base (6.1 g.) is obtained. By formation of the acid dioxalate in methanol and recrystallisation from methanol there is finally obtained 3-dimethylsulphamoyl-10-[3 - (4 - dimethylcarbamoyloxyethyl - piperazinyl)2-methylpropyl]phenthiazine acid dioxalate, M.P. 182–183° C.

The phenthiazine derivative used as the starting material may be obtained by the deacetylation of 3-dimethylsulphamoyl - 10 - [3 - (4 - acetyl - 1 - piperazinyl)-2-methylpropyl]phenthiazine (M.P. 156° C.), itself obtained by the condensation of 3-(4-acetylpiperazinyl)-2-methylchloropropane with 3-dimethylsulphamoylphenthiazine in xylene under reflux in the presence of sodium tert-butylate.

Example V

By heating 3-methanesulphonyl-10-(3-1'-piperazinyl-2-methylpropyl)phenthiazine (M.P. 182–183° C.) (6 g.) with anhydrous potassium carbonate (2.58 g.), 2-chloroethyl dimethylcarbamate (2.84 g.) and toluene (6 cc.) for 7 hours under reflux at 115–120° C. as in the preceding example, there is obtained after treatment of the reaction mixture a crude resinous base (6.3 g.). By filtration through a column of alkaline alumina of a solution of this base in a mixture of equal parts of benzene and cyclohexane and by successive elutions with pure benzene followed by mixtures of benzene with 10% and 20% of ethyl acetate, there is obtained after combining the various eluates and evaporating them under reduced pressure, 3-methanesulphonyl-10-[3-(4-dimethylcarbamoyloxyethyl - 1 - piperazinyl) - 2 - methylpropyl]phenthiazine (3.8 g.), M.P. 142–143° C.

The initial phenthiazine derivative may be obtained by deacetylation of 3-methanesulphonyl-10-[3-(4-acetyl-1-piperazinyl) - 2 - methylpropyl]phenthiazine (M.P. 157° C.), itself obtained from 3-methanesulphonylphenthiazine as described in Example IV.

Example VI

By heating 3-cyano-10-(3-1'-piperazinyl-2-methylpropyl)phenthiazine (M.P. 101° C.) (6 g.) with the same reactants and under the same conditions as in Example IV and then treating the reaction mass in the same manner, a crude resinous base (6.1 g.) is obtained. By formation of the acid dimaleate in ethanol and recrystallisation from methanol of the crystals obtained, there is finally obtained 3-cyano-10-[3-(4-dimethylcarbamoyloxyethyl-1-piperazinyl)-2-methylpropyl]phenthiazine acid dimaleate, M.P. 186–187° C. (inst.) with decomposition.

The phenthiazine derivative starting material may be obtained by deacetylation of 3-cyano-10-[3-(4-acetyl-1-piperazinyl)-2-methylpropyl]phenthiazine (M.P. 123° C.) itself obtained by condensation of 3-(4-acetyl-1-piperazinyl)-2-methylchloropropane with 3-cyanophenthiazine in xylene under reflux in the presence of sodamide.

Example VII

A solution of 3-dimethylsulphoamoyl-10-(3-1'-piperazinylpropyl)phenthiazine (6 g.), 2-chloroethyl dimethylcarbamate (3.2 g.) and triethylamine (2.11 g.) in anhydrous xylene (10 cc.) is heated for 5 hours under reflux.

After cooling, the reaction mass is extracted with N sulphuric acid (65 cc.) and the aqueous phase is washed with ethyl acetate (20 cc.). The aqueous phase is then made alkaline with a saturated aqueous solution of potassium carbonate (20 cc.), the liberated base is extracted with ethyl acetate (2 x 50 cc. followed by 20 cc.) and the organic extracts are dried over anhydrous potassium carbonate and evaporated to dryness on the water-bath.

The oily residue (8.4 g.) is dissolved in a 1:2 mixture (100 cc.) of cyclohexane and benzene. The solution is filtered through a column of chromatographic alumina (120 g.) and eluted successively with the same mixture (300 cc.), benzene (300 cc.), a 9:1 mixture (200 cc.) of benzene and ethyl acetate and a 7:3 mixture (500 cc.) of benzene and ethyl acetate. After concentration to dryness of the various eluates a total of 6.15 g. of purified base is obtained which is converted into a dihydrochloride in ethanol. After recrystallisation from ethanol, there is obtained 3-dimethylsulphamoyl-10-[3-(4 - dimethylcarbamoyloxyethyl - 1 - piperazinyl)propyl]phenthiazine dihydrochloride (4.8 g.) as a creamy white crystalline powder melting at about 200° C. with decomposition.

Example VIII

A solution of 3-cyano-10-[3-(4-2'-hydroxyethyl-1-piperazinyl) propyl]phenthiazine (15.75 g.) in anhydrous benzene (80 cc.) is treated with methyl isocyanate (5.7 g.). The mixture is left to stand at 25° C. for 1 hour and is then boiled under reflux for 45 minutes.

After evaporation of the solvent in vacuo there is obtained 3 - cyano - 10 - [3 - (4 - methylcarbamoyloxyethyl-1-piperazinyl)propyl]phenthiazine (18 g.) whose acid dimaleate, crystallised from ethanol, melts at 190–192° C. and whose dihydrochloride, crystallised from methanol, melts at about 205–215° C.

Example IX

3 - methylthio - 10 - [3 - (4 - 2' - hydroxyethyl - 1-piperazinyl)2-methylpropyl]phenthiazine (M.P. 132° C.) (2 g.) dissolved in anhydrous benzene (50 cc.) is mixed with methyl isocyanate (1 cc.). The solution obtained is left for 24 hours at ordinary temperature and is then heated for 1 hour under reflux. After filtration and evaporation under reduced pressure there is obtained an oily basic product (1.8 g.) which is purified by formation of an acid dimaleate in ethanol. After recrystallisation from methanol of the crystals formed there is finally obtained 3-methylthio-10-[3-(4-methylcarbamoyloxyethyl - 1 - piperazinyl) - 2 - methylpropyl]phenthiazine acid dimaleate (1.35 g.), M.P. 170–171° C.

Example X

A mixture of 3-methanesulphonyl-10-(3-1'-piperazinylpropyl)phenthiazine (6 g.), 2-chloroethyl dimethylcarbamate (3.5 g.), anhydrous triethylamine (2.25 g.) and anhydrous xylene (13 cc.) is heated under reflux for 6 hours with agitation. Water (40 cc.) is run into the cooled mixture and the whole is extracted with benzene. The benzene solution is in its turn extracted with N hydrochloric acid (30 cc.) and the base is liberated with sodium hydroxide and extracted with benzene. The benzene is removed in vacuo and there is obtained 3-methanesulphonyl - 10-[3-(4-dimethylcarbamoyloxyethyl-1-piperazinyl)propyl]phenthiazine (8 g.) in the form of the base, the dimaleate of which, crystallised from ethanol, melts at 150–152° C.

Example XI

A solution of methyl isocyanate (1.7 g.) in benzene (5 cc.) is added to a solution of 3-methylthio-10-[3-(4-2'-hydroxyethyl-1-piperazinyl)propyl]phenthiazine (6.5 g.) in anhydrous benzene (20 cc.) cooled to +5° C. The mixture is left overnight at ordinary temperature and is then heated under reflux for 2 hours. The benzene is removed in vacuo and there is obtained 3-methylthio-10-[3-(4-methylcarbamoyloxyethyl-1-piperazinyl)-propyl]phenthiazine (7 g.) in the form of the base, the di-maleate of which, crystallised from 50% aqueous methanol, melts at 176° C.

Example XII

Proceeding as in Example XI but commencing with 3-dimethylsulphamoyl-10-[3-(4-2'-hydroxyethyl-1-piperazinyl)propyl]phenthiazine (7.3 g.) and methyl isocyanate (1.7 g.) there is obtained 3-dimethylsulphamoyl-10-[3-(4-methylcarbamoyloxyethyl-1-piperazinyl)propyl]phenthiazine (8 g.) in the form of the base which, recrystallised from a mixture of equal parts of benzene and cyclohexane, melts at 126° C.

We claim:
1. 3-cyano-10-[3-(4-dimethylcarbamoyloxyethyl-1-piperazinyl)propyl]phenthiazine.
2. 3-cyano-10-[3-(4-methylcarbamoyloxyethyl-1-piperazinyl)-propyl]phenthiazine.
3. The acid addition salts of 3-cyano-10-[3-(4-dimethylcarbamoyloxyethyl-1-piperazinyl)-propyl]phenthiazine having pharmaceutically acceptable anions.
4. The acid addition salts of 3-cyano-10-[3-(4-methylcarbamoyloxyethyl-1-piperazinyl)-propyl]phenthiazine having pharmaceutically acceptable anions.

References Cited in the file of this patent
UNITED STATES PATENTS

| | | |
|---|---|---|
| 2,860,138 | Sherlock et al. | Nov. 11, 1958 |
| 2,877,224 | Jacob et al. | Mar. 10, 1959 |